United States Patent

Ryswick

[15] 3,680,414
[45] Aug. 1, 1972

[54] SHORT WORKPIECE CONTROL

[72] Inventor: Edward L. Ryswick, Rochester, N.Y.

[73] Assignee: Varispace Industries, Inc., East Rochester, N.Y.

[22] Filed: Dec. 30, 1969

[21] Appl. No.: 889,284

[52] U.S. Cl. ........................... 82/2.5, 82/2.7, 82/34
[51] Int. Cl. ........................................... B23b 13/00
[58] Field of Search ........................ 82/2.5, 2.7, 34

[56] References Cited

UNITED STATES PATENTS

| | | | |
|---|---|---|---|
| 2,320,039 | 5/1943 | Jobert | 82/2.7 X |
| 2,159,398 | 5/1939 | Montgomery et al. | 82/2.7 X |
| 2,274,230 | 2/1942 | Bechler | 82/2.5 X |

FOREIGN PATENTS OR APPLICATIONS

| | | | |
|---|---|---|---|
| 372,201 | 7/1961 | Switzerland | 82/2.5 X |

Primary Examiner—Leonidas Vlachos
Attorney—Cumpston, Shaw & Stephens

[57] ABSTRACT

A workpiece measuring device is arranged to interrupt an automatic metal working machine if workpieces are short. The device includes a feeler movably mounted to extend into the path of relative motion of the machine's index mechanism for indexing tools or workpieces. An electric switch is operated by the feeler when workpieces of adequate length engage the feeler and move it during indexing. The switch is arranged in an RC circuit that interrupts the machine after lapse of an interval slightly exceeding the time for one cycle of the indexing mechanism, and actuation of the switch for each workpiece of adequate length disables the interruption to allow the machine to continue operation so long as no short or missing workpieces are encountered by the feeler.

15 Claims, 6 Drawing Figures

AUTOMATIC SCREW MACHINE

PATENTED AUG 1 1972 3,680,414
SHEET 1 OF 2
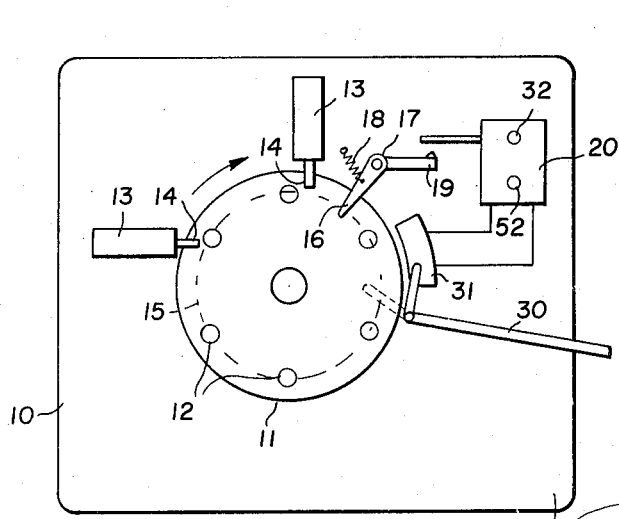
FIG. 1   AUTOMATIC SCREW MACHINE
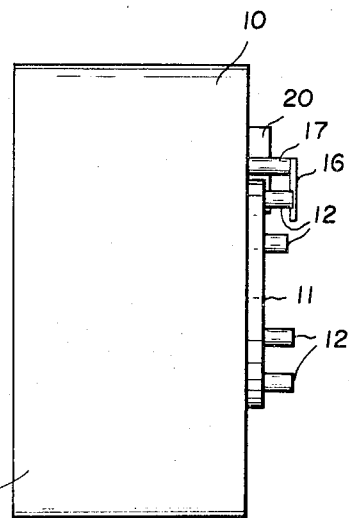
FIG. 2
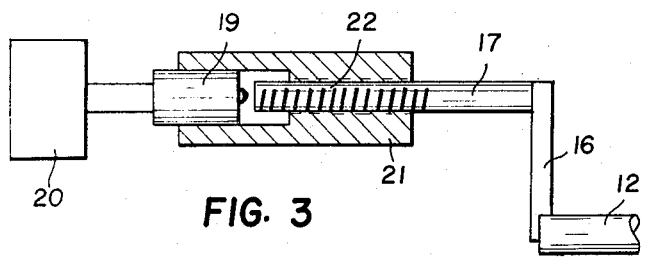
FIG. 3
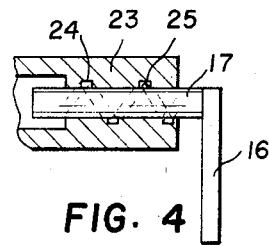
FIG. 4
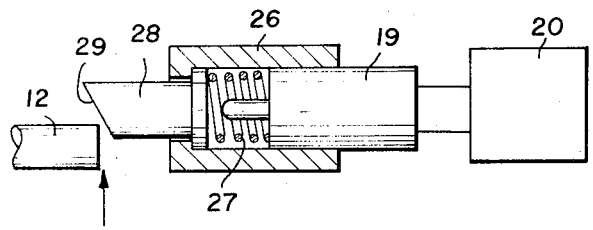
FIG. 5
INVENTOR.
EDWARD L. RYSWICK
BY Cumpston, Spear
and Stephens
ATTORNEYS 3,680,414

SHORT WORKPIECE CONTROL

THE INVENTIVE IMPROVEMENT

Many devices have been suggested for automatic metal working machines to detect stock exhaustion and shut down the machine or reject defective parts. Some devices have also been proposed for sending the length of stock fed to a work station to see if it is adequate for the desired operation. However, the requirements for successful workpiece measuring in modern metal working machines are complex and stringent, and prior art proposals have not been successful.

The invention involves recognition of the requirements for successful operation of a workpiece measuring device, and meeting these requirements with a device that is simple, accurate, economical, compact, trouble-free, and reliable. The invention also aims at a device that can withstand the hostile environments in screw machines, automatic lathes, and other metal working equipment, can respond to high-speed operation, is compatible with existing machines, and does not impair or detract from machine operations.

Some of the requirements recognized and met with the inventive device are an electrical operation that is simple, reliable, and compatible with existing machine circuitry. The inventive device is compact to fit into complex and crowded areas and is built to survive in an oil-laden atmosphere. The prior art contains suggestions for workpiece measuring or sensing devices that occupy one of the machine's index stations, but this so detracts from the machine's value and versatility that it is an unacceptable solution. Devices operating in the stock feed tube to detect the trailing end of the stock are not fully satisfactory, because poor adjustment or synchronization of the feed clutches that advance the stock can cause short workpieces, even when the stock is not exhausted. Switches or sensors arranged on the stock stop are inadequate because misadjustment of the stock feeding clutches can make the stock bounce back from the stock stop to cause a short workpiece.

The invention recognizes the need for measuring workpiece length before operations such as tapping or threading where a short workpiece can cause retraction of a die before it has disengaged from the threads. This breaks the die and causes expensive tool replacement and the loss of time and labor in making repairs. Also, some workpieces have critical lengths and must not be short. Any machine failure that produces short workpieces causes expensive sorting, part rejection, or failure in the equipment using the part.

SUMMARY OF THE INVENTION

The inventive solution to these problems is applicable to automatic metal working machines having an index mechanism for indexing tools or workpieces successively to work stations. The device includes a movable feeler mounted on the machine to extend into the path of motion of the indexing mechanism relative to the machine for engaging workpieces to move the feeler during indexing. A switch is actuated by a predetermined movement of the feeler, and the feeler is arranged so that only the work pieces that are of adequate length can move the feeler in the pre-determined movement to actuate the switch. The switch is arranged in a circuit that interrupts the operation of the machine after lapse of an interval slightly exceeding the time for one cycle of the indexing mechanism, and the switch disables such interruption with each actuation so that the machine continues to operate so long as successive workpieces actuate the feeler switch. The machine shuts down shortly after a short or missing workpiece fails to actuate the feeler switch during an indexing.

DRAWINGS

FIG. 1 is a schematic, front-elevational view of an automatic screw machine equipped with the inventive workpiece control system;

FIG. 2 is a side elevational view of the machine of FIG. 1;

FIGS 3 – 5 are partially schematic and partially sectional views of alternative feeler and switch arrangements for use in the inventive system.

DETAILED DESCRIPTION

Figure 6:
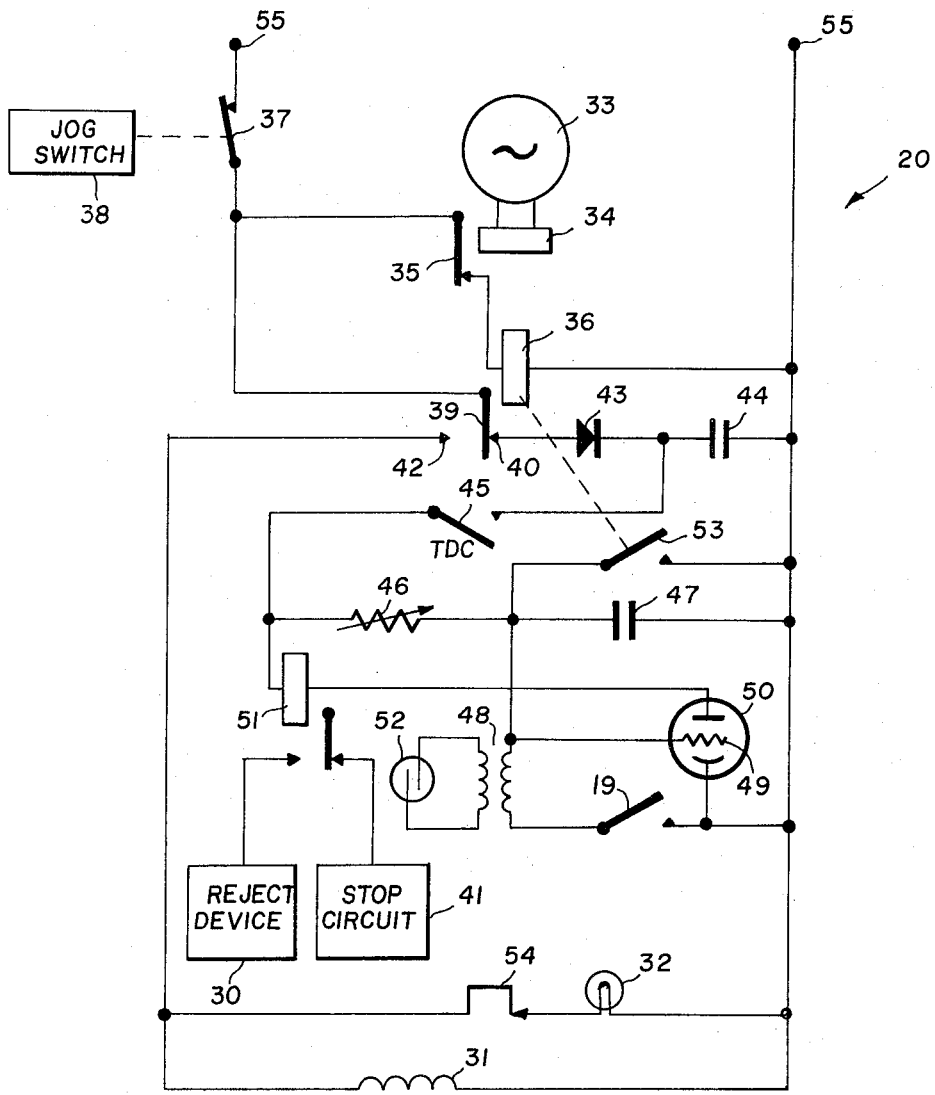
FIG. 6 is a schematic circuit diagram of a circuit for use in the inventive system.

The inventive control is illustrated as applied to an automatic screw machine that is only schematically represented for simplicity.

The inventive control can be applied to a variety of automatic metal working machines having index mechanisms for indexing tools or workpieces successively to work stations. This includes multi-spindle, automatic screw machines, automatic turret lathes, multi-tool milling machines, and other equipment. The inventive system uses the relative motion of the index mechanism for measuring workpieces and interrupting the machine operations whenever a short or missing workpiece is detected. If the workpiece to be measured stays in position in the machine and tools are indexed to the workpiece, then the feeler is arranged on the index mechanism between tools; if the workpieces are indexed to successive work stations as in a multi-spindle, automatic screw machine, then the feeler is arranged on the machine in the path of movement of the workpieces between work stations.

As shown in schematically illustrated screw machine 10 in FIGS. 1 and 2, an index mechanism 11 moves stock or workpieces 12 successively to the six work stations spaced around index mechanism 11. Stock 12 is rotated at each of the work stations so that tool slides 13 can advance tools 14 into engagement with workpieces 12 for machine operations, all as generally well-known.

For each indexing movement, indexing mechanism 11 turns clockwise as shown by the arrow, one-sixth of a revolution. This moves workpieces 12 relative to machine 10 along path 15. Feeler 16 is carried on rotatable rod 17 and biased by spring 18 to extend movably into path 15. As each workpiece 12 moves from the 12 o'clock to the 2 o'clock position as illustrated in FIG. 1 it engages and moves feeler 16 to turn rod 17 in a counter clockwise direction providing that the particular workpiece is long enough to engage feeler 16. Such rotation of rod 17 is used to control machine 10 according to the invention as described more fully below.

Feeler 16 can be arranged anywhere between work stations around the periphery of index mechanism 11 and is preferably located just ahead of a work station at which a critical operation is performed so it can measure workpieces 12 at the optimum time. For example, if the operation at the 2 o'clock station illustrated in FIG. 1, is a tapping operation in which a die would be broken if a workpiece were short, then feeler 16 is preferably placed as illustrated just ahead of the two o'clock station to interrupt the machine before any such accident.

Feelers similar to feeler 16 can also be arranged on machines which index a sequence of tools to a single work station by arranging such a feeler on the indexing mechanism so that it extends into the path of relative motion between the indexing mechanism and the machine. Such a feeler mounted between tools on an indexing mechanism is swept past the workpiece during indexing motion to be moved by the workpiece for measuring its length.

Movement of rod 17 carrying feeler 16 is used to actuate an electric switch 19 arranged in a control circuit 20 for controlling machine 10 according to the invention. Switch 19 is schematically illustrated in FIGS. 1 and 2 and is preferably an enclosed switch that is well housed and protected from the oil-laden atmosphere in machine 10.

FIGS. 3 – 5 show three alternative preferred embodiments for housing and actuating switch 19. As shown in FIG. 3 microswitch 19 is encased in a housing 21 to which rod 17 is coupled by screw threads 22. Threads 22 are arranged so that when feeler 16 and rod 17 are rotated by a moving workpiece 12, rod 17 is moved axially against switch 19.

The axial motion of rod 17 and feeler 16 is used not only to actuate switch 19 but to perform a measuring function. Such axial motion is arranged to move feeler 16 away from the end of workpiece 12 so that a slightly short workpiece 12 may engage feeler 16 and move it a few degrees until feeler 16 moves axially enough to slip off the end of workpiece 12. If workpiece 12 is not long enough to maintain its engagement with feeler 16 during the axial travel of rod 17 and feeler 16 away from the end of workpiece 12, then workpiece 12 will not move feeler 16 far enough to actuate switch 19. This movement of feeler 16 away from the end of workpiece 12 allows a convenient and fine adjustment of feeler 16 for accurate measurement of workpieces without each workpiece having to barely engage feeler 16 by a thin, overlapping edge. This results in longer wear and greater reliability in feeler 16.

By proper selection of threads 22 for righthand or lefthand advance, housing 21 can be arranged on machine 10 to face in either direction relative to workpieces 12 and provide the desired motion of feeler 16 away from the ends of workpieces 12 during indexing. Housing 23 shown in FIG. 4 alternates for housing 21 and has a helical slot 24 engaged by a pin 25 on rod 17 carrying feeler 16. Slot 24 is arranged so that rotation of rod 17 causes the same axial movement of rod 17 as described above for the embodiment of FIG. 3.

In the alternative arrangement shown in FIG. 5, micro-switch 19 is arranged in a housing 26 that holds a compression spring 27 biasing a push-button 28 outward away from switch 19. Pushbutton 28 has an engagement or cam surface 29 that is inclined relative to the direction of motion of workpieces 12 as shown by the arrow, so that workpiece of sufficient length moves relative to inclined surface 29 to depress pushbutton 28 to actuate switch 19.

FIG. 6 is a simplified schematic diagram of one preferred way of controlling machine 10 by means of switch 19. Generally circuit 20 is arranged for interrupting the operation of machine 10 after lapse of an interval slightly exceeding the time for one cycle of indexing mechanism 11, and switch 19 disables such interruption on each actuation of switch 19. The result is that machine 10 operates so long as switch 19 is closed on each indexing cycle in response to measurement of a workpiece 12 of adequate length by feeler 16, but as soon as a short or missing workpiece fails to actuate switch 19, circuit 20 causes a machine interruption. Such interruption preferably includes stopping machine 10 and can also include operation of a brake 31 for stopping machine 10 quickly, and operation of other mechanisms on machine 10 such as clutches or drives for operating tools. In addition, such interruption preferably includes flashing a light 32 to indicate that the machine shutdown is for a short or missing workpiece.

Whenever machine 10 is operated, a power source 33 energizes control relay 34 to close switch 35 for energizing main relay 36 to operate the inventive control system under power from points 55 if switch 37 is closed. Switch 37 is preferably coupled to the stop circuit 41 and jog switch 38 for machine 10 so that the operator can jog the machine with switch 37 open and the control system inoperative. With machine 10 running in normal operating condition, switch 37 is closed, and main relay 36 holds switch 39 against contact 40. This condition prevails until the machine's stop circuit 41 is actuated to open switch 37 to deenergize main relay 36 and let switch 39 move to contact 42.

Beginning with the start-up of machine 10 for normal operation, switch 37 is closed as illustrated so that main relay 36 is energized to hold switch 39 against contact 40. In this condition, diode rectifier 43 and capacitor 44 provide a stabilized ripple voltage that is applied through time delay closure switch 45 to an RC circuit comprising variable resistor 46 and capacitor 47. Time delay closure switch 45 allows sufficient machine operation to bring the first of the partially machined workpieces 12 into engagement with feeler 16 as it passes to the two o'clock work station. This prevents premature shutdown of the machine by control circuit 20 before the first workpiece 12 is measured.

The RC circuit comprising resistor 46 and capacitor 47 has an adjustable time constant of slightly more than one index cycle. Each actuation of switch 19 in response to a workpiece of adequate length discharges capacitor 47 through transformer 48 to prevent the charge on capacitor 47 from placing sufficient voltage on grid 49 of thyratron 50 so that thyratron 50 can fire. If a short or missing workpiece occurs, switch 19 is not actuated during an index movement, and the charge on capacitor 47 rapidly rises to the firing level of thyratron 50. Firing of thyratron 50 energizes stop relay 51 which actuates stop circuit 41 to shut down machine 10 and also operates reject device 30 and other equipment on machine 10 as desired. Each actuation of switch 19 in response to a full-length workpiece causes an energization of neon lamp 52 through transformer 48 as capacitor 47 discharges, so that lamp 52 winks with each full-measure workpiece to show that control circuit 20 is operating and actually measuring workpieces.

When stop circuit 41 is operated by actuation of relay 51 switch 37 is opened and main relay 36 is de-energized so that switch 53 closes and switch 39 moves to contact 42. This shuts off the RC circuit containing resistor 46 and capacitor 47 and discharges any residual charge on capacitor 47 through switch 53. Through contact 42 brake 31 is energized to stop machine 10, and thermal cutout flasher 54 is energized to flash lamp 32 to indicate that the machine shutdown is for a short or missing workpiece. Other machine functions can also be stopped or interrupted through contact 42, stop circuit 41, or reject device 30.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will understand ways that the inventive control system can be applied to other metal-working machinery and ways that the inventive system can be adapted and varied for use in particular equipment. Other control circuits can accomplish the inventive control system, and many variations of feeler devices and switches can be used in the inventive system.

I claim:

1. In an automatic metal working machine having an index mechanism for indexing tools or workpieces successively to work stations, a short workpiece control system comprising:
   a. a movable feeler comprising a rotatable rod and an arm extending radially from said rod;
   b. means for mounting said feeler on said machine in the region of the path of motion of said indexing mechanism relative to said machine;
   c. said feeler arm being arranged for extending into said path of relative motion to a position for engaging the forward regions of said workpieces to move said feeler during said motion of said indexing mechanism between said work stations;
   d. means for displacing said feeler axially of said workpieces to the forward ends of said workpieces during said feeler movement;
   e. an electric switch arranged on said machine to be actuated by a pre-determined amount of said axial displacement of said feeler;
   f. a housing for said feeler rod;
   g. a coupling between said rod and said housing for moving said rod axially to actuate said switch as said rod rotates;
   h. said feeler being arranged so that only the ones of said workpieces that are of adequate length can cause said axial displacement of said feeler by said pre-determined amount to actuate said switch;
   i. an electric circuit including said switch;
   j. said circuit being arranged for interrupting the operation of said machine after lapse of an interval slightly exceeding the time for one cycle of said indexing mechanism; and
   k. said switch being arranged in said circuit for disabling said interruption upon said switch actuation.

2. The system of claim 1 wherein said machine includes a reject mechanism, and said circuit is arranged so said interruption comprises operating said reject mechanism to reject a short one of said workpieces.

3. The system of claim 1 wherein said circuit is arranged so said interruption comprises indicating a short or missing one of said workpieces.

4. The system of claim 1 wherein said circuit is arranged so said interruption comprises stopping said machine.

5. The system of claim 4 wherein said circuit is arranged so said interruption comprises indicating a short or missing one of said workpieces.

6. The system of claim 1 wherein said circuit includes means for indicating said actuations of said switch to show that said workpieces have adequate length.

7. The system of claim 1 wherein said coupling comprises a screw thread connection.

8. The system of claim 1 wherein said coupling comprises a cam and a follower.

9. The system of claim 1 including means for disabling said interruption during start-up of said machine.

10. The system of claim 1 wherein said circuit includes resistor and capacitor means for timing said interval.

11. The system of claim 10 wherein said switch is arranged for discharging a capacitor of said resistor and capacitor means upon said switch actuation.

12. The system of claim 11 including an indicator lamp arranged to be energized by said capacitor discharge to indicate a workpiece of adequate length.

13. The system of claim 1 wherein said circuit is arranged so said interruption comprises indicating a short or missing one of said workpieces.

14. The system of claim 13 wherein said circuit is arranged so said interruption comprises stopping said machine.

15. The system of claim 14 including means for disabling said interruption during start-up of said machine.

* * * * *